United States Patent Office 3,553,174
Patented Jan. 5, 1971

3,553,174
REACTION PRODUCT OF A HYDROXYACRYLATE AND AN ALIPHATIC ISOCYANATE AND TRANSPARENT ARTICLE MADE THEREFROM
Robert W. Hausslein, Lexington, Arthur L. Walitt, Cambridge, and Henry E. Molvar, Jr., Billerica, Mass., assignors to Amicon Corporation, Lexington, Mass., a corporation of Massachusetts
No Drawing. Filed Nov. 27, 1967, Ser. No. 685,959
Int. Cl. C08g 22/08, 53/00
U.S. Cl. 260—77.5                                  8 Claims

ABSTRACT OF THE DISCLOSURE

A new process for forming transparent and abrasion-resistant articles of high impact resistance comprising the steps of carrying out step-growth polymerization of an aliphatic isocyanate compound and a hydroxyacrylate compound while concurrently carrying out chain-growth polymerization of said hydroxyacrylate compound. The invention also relates to novel compositions of matter formed by the aforesaid process and to the novel transparent articles formed therewith.

BACKGROUND OF THE INVENTION

It has, for some years now, been desired to form suitable lenses from transparent plastics. Such plastics hold considerable promise as fracture-resistant materials which are easily formable at moderate temperatures. However, a number of problems have prevented such plastics from being generally used in such large volume applications as, for example, eyeglass lenses where a combination of clarity, strength and abrasion characteristics are required.

Thermoplastic lenses are susceptible to scratching and are not suitable for long-term use. Thermosetting lenses have been prepared and have relatively good scratch-resisting characteristics. However, thermosetting resins of high enough abrasion resistance to effectively compete with glass are still being sought. Of course, it is most important that this abrasion resistance be achieved without excessive loss in resistance to fracture or in clarity. Moreover, it is important that materials used for lenses be relatively free from discoloration and distortions caused by turbid regions in the material.

SUMMARY OF THE INVENTION

Therefore, it is an object of the present invention to provide a process whereby suitably strong and scratch resistant plastic lenses can be prepared without imparting excessive discoloration and turbidity to the plastic material.

It is a further object of the invention to provide a novel composition of matter suitable for the preparation of abrasion-resistant polymers of high clarity.

Other objects of the invention will be obvious to those skilled in the art from reading this specification.

These objects have been largely achieved with the thermoset polymer product formed by a controlled concurrent reaction of an organic polyisocyanate and a hydroxyacrylate. This reaction really comprises the concurrent chain-growth ethylenic polymerization of the hydroxyacrylate compound to form a linear-type polymer chain and the step-growth polymerization reaction of NCO and OH groups between the isocyanate and hydroxy group of the acrylate.

Among the isocyanates which are operable in the process of the invention are di- and tri- and tera-isocyanates including aliphatic isocyanates such as, methylene bis(4,4'-cyclohexyl isocyanate) available under the trade designation Nacconate H–12 and a low molecular weight adduct of hexamethylene diisocyanate having an average of about 3 NCO groups per adduct molecule and available under the trade designation Desmodur N in a form comprising 100% solids. Also useful in the process of the invention are such compounds as diethylbenzene diisocyanate (DBDI) which is representative of the general class of compounds represented by Formula I:

$$(OCN)_n—R_1—A—R_2—(NCO)_n \quad (I)$$

wherein N represents an integer from 1 to 2, A represents an aryl-containing radical and wherein $R_1$ and $R_2$ each represent a divalent aliphatic, e.g., alkylene, radical of at least two carbon atoms. Aryl radical A may be a phenyl radical or a radical containing a plurality of phenyl radicals, e.g., of the Formula II.

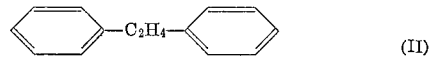
(II)

In general the size of the aryl and aliphatic groups in Formula I is limited by steric considerations and excessive melting points which would eliminate the compounds from practical utilization in the process described hereinbelow.

Among hydroxyacrylates useful in the process of the invention are such compounds as hydroxyalkylacrylates and hydroxymethacrylates with the hydroxyalkylacrylates the more advantageous for lens manufacture. Illustrative of such compounds are hydroxypropylacrylate (HPA)
hydroxyethylacrylate (HEA)
hydroxypropylmethacrylate
hydroxyethylmethacrylate
hydroxy n-butyl acrylate
hydroxy n-octyl acrylate
hydroxy iso-butyl acrylate The polymerization reaction between hydroxyacrylate and isocyanate compounds is advantageously promoted by radiation or catalytic techniques.

Catalysts useful in promoting the reaction include free radical catalysts which are adapted for reaction at moderately low temperatures as, for example, tertiary butyl peracetate, diisopropylpercarbonate, bis (azobutyronitrile), benzoyl peroxide and the like. Preferably the catalyst is chosen to promote the acrylate polymerization at a rate sufficiently below that of the hydroxyl-isocyanate condensation to minimize the probability of even slight phase-separation, and resultant turbidity, from occuring during the reaction. In any event, once the polymerization is started no disturbing phenomena such as the injection of new reactants is tolerable.

However, use of such catalysts, although advantageous for convenient preparation of desired reaction products is not necessary with every reaction system. For example, fairly clear castings of good rigidity can be prepared from hydroxyethyl acrylate and Desmodur N with no catalyst at all. On the other hand, some systems such as the hydroxypropylacrylate/Nacconate H–12 reaction product are relatively sensitive to the presence of catalysts. In this latter system, excellent plastics for optical use are provided when diisopropyl percarbonate is present in the reaction system at 0.5% by weight based on the weight of the hydroxyacrylate. Catalyst loadings as high as 1% result in castings of considerably poorer optical properties, i.e., an undesirable increase in the amount and severity of turbidity in the cast lens.

In the process of the invention, it is desirable that the reactants be free of moisture because even small quantities of moisture, say quantities above about 0.1%, tend to contribute to an undesirable turbidity formation during curing. Thus the hydroxyacrylate compound is advantageously dried with silica gel or alumina or some other suitable desiccant prior to reaction with the isocyanate compound.

Moreover, to assure the prevention of bubble formation in the cured resin, degassing of the hydroxyacrylate-isocyanate mixture prior to its being cast into a mold is most desirable.

Use of a hydrophobic release agent, for example, trichloromethylsilane or the like, on the walls of the casting molds is helpful in promoting easy release of cured lens castings from the mold without excessive danger of damaging the casting.

The process of the invention is suitably initiated by mixing the isocyanate, hydroxyacrylate and catalyst at about 0 to 20° C. and filling a mold with the mixture. Thereupon the mold is heated to about 40° C. for at least about 3 to 5 hours, i.e., until the reaction has proceeded to the extent that the reaction mixture gels. The temperature is then raised to about 65 to 95° C. preferably about 75 to 80° C., and maintained at this higher temperature for about 12 to 25 hours after which time the cured polymer is removed from the mold.

POLYMER EVALUATION PROCEDURES

Abrasion resistance of candidate materials for optical lens applications are suitably tested by measuring the "haze gain," that is the increased light scattering effect, caused by a controlled amount of abrasive action on the surface of the materials. The instrument used for this test comprises an abrasive-filled and carefully-weighted pad mounted on a reciprocating arm. The pad is driven back and forth over the surface of the plastic being tested under a specified load, and at a specified speed for a given number of strokes. A critical aspect of this test appears to be the choice of the pad for holding the abrasive. A small piece of the wool felt polishing pad sold under the trade designation Blue-Streak M–306–M is appropriate for this purpose.

The pressure with which the abrasive-filled pad is applied to the plastic sample being tested is 200 grams per square inch, the speed of travel across the sample is 3.3 inches per second, and the abrasive used is that sold under the trade designation #600 Grit Carborundum. The abrading pad is preferably shaped by its holder to the same curvature as the sample to be tested. The diameter of the pad is 0.93 inch.

The plastic material to be tested is cleaned by washing with soap and water and drying with compressed air. All handling of the sample is accomplished by the edges to prevent finger smudges. The sample is then tested according to ASTM D 1003–52 to establish a zero point with respect to its haze level. After the zero point is established, the sample is subjected to 100 strokes with the abrader and its haze gain is measured and reported in terms of "percent gain."

Impact strength measurements were carried out with a Gardner Falling Impact Tester known to the art.

The desirable articles of the invention have haze gains of less than 10% and impact strengths of at least about 3 in.–lbs. The most-preferred articles, i.e., those formed of very dry monomer, have much higher impact strengths, i.e., above about 10 in.–lbs.

The following working examples prepared according to the procedures described above are presented as illustrative of the process of the invention and the products produced thereby. The molds used in preparing the samples used in the working examples comprised two glass plates separated by a silicone rubber gasket of about one-eighth inch in thickness. Injection of the reaction mixture into the mold was accomplished with a hypodermic needle.

EXAMPLE 1

A quantity of 10.0 grams of hydroxypropylacrylate and 10.0 grams of methylene bis(4,4'-cyclohexyl isocyanate) were mixed, degassed, put into molds of the character described, and reacted at 40° C. for 16 hours. Curing was carried out at 70° C. for an additional 16 hours. 0.05 gram of diisopropylpercarbonate were used to catalyze the reaction. This amounted to 0.5% based on the weight of the hydroxyacrylate compound. The isocyanate to hydroxyl ratio of the reaction system was 1.0.

EXAMPLE 2

A quantity of 15 grams of hydroxypropylacrylate and 3.75 grams of methylene bis(4,4'-cyclohexylisocyanate) were mixed, degassed, put into molds of the character described, and reacted at 40° C. for 16 hours. Curing was carried out at 70° C. for an additional 16 hours. 0.075 gram of diisopropylpercarbonate were used to catalyze the reaction. This amounted to 0.5% based on the weight of the hydroxyacrylate compound. The isocyanate to hydroxyl ratio of the reaction system was 0.25.

EXAMPLE 3

A quantity of 30.0 grams of hydroxypropylacrylate and 10.9 grams of Desmodur N were mixed, degassed, put into a mold of the character described, and reacted at 40° C. for 16 hours. Curing was carried out at 70° C. for an additional 16 hours. 0.15 gram of diisopropylpercarbonate were used to catalyze the reaction. This amounted to 0.5% based on the weight of the hydroxyacrylate compound. The isocyanate to hydroxyl ratio of the reaction system was 0.25.

EXAMPLE 4

A quantity of 11.6 grams of hydroxyethylacrylate and 13.0 grams of methylene bis(4,4'-cyclohexylisocyanate) were mixed, degassed, put into a mold of the character described, and reacted at 40° C. for 16 hours. Curing was carried out at 70° C. for an additional 16 hours. 0.058 gram of diisopropylpercarbonate were used to catalyze the reaction. This amounted to 0.5% based on the weight of the hydroxyacrylate. The isocyanate to hydroxyl ratio of the reaction system was 1.0.

EXAMPLE 5

A quantity of 12.3 grams of hydroxyethylacrylate and 20.0 grams of Desmodur N were mixed, degassed, put into a mold of the kind described, and reacted at 40° C., for 16 hours. Curing was carried out at 70° C. for an additional 16 hours. A quantity of 0.06 gram of diisopropylpercarbonate were used to catalyze the reaction. This amounted to 0.5% based on the weight of the hydroxyacrylate. The isocyanate to hydroxyl ratio of the reaction system was 1.0.

EXAMPLE 6

A quantity of 20.0 grams of hydroxyethylacrylate and 24.4 grams of Desmodur N were mixed, degassed, put into a mold of the character described, and reacted at 40° C. for 16 hours. Curing was carried out at 70° C. for an additional 16 hours. 0.1 gram of diisopropylpercarbonate was used to catalyze the reaction. This amounted to 0.5% based on the weight of the hydroxyacrylate compound. The isocyanate to hydroxyl ratio of the reaction system was 0.75.

The above procedure was repeated at catalyst levels of 0.25, 1.0 and 2.0% based on the hydroxyacrylate. The material prepared with a 2% catalyst level showed a small but undesirable degree of turbidity.

EXAMPLE 7

A quantity of 20.0 grams of hydroxyethylacrylate and 16.2 grams of Desmodur N were mixed, degassed, put into a mold of the kind described and reacted at 40° C. for 16 hours. 0.1 gram of diisopropylpercarbonate was used to catalyze the reaction. This amounted to 0.5% based on the weight of the hydroxyacrylate. The isocyanate to hydroxyl ratio of the reaction system was 0.5.

The above procedure was repeated at an isocyanate to hydroxyl ratio of 0.25, but the resulting polymer was excessively soft and limp.

EXAMPLE 8

A quantity of 13 grams of hydroxypropylacrylate and 10.8 grams of diethylbenzene diisocyanate were mixed, degassed, put into a mold of the kind described and then reacted at 40° C. for 16 hours. Curing was carried out at 70° C. for an additional 16 hours. 0.065 gram of diisopropylpercarbonate was used to catalyze the reaction. This amounted to 0.5% based on the weight of the hydroxyacrylate compound. The isocyanate to hydroxyl ratio of the reaction system was 1.0.

EXAMPLE 9

A quantity of 15.4 grams of the transesterification product of an equimolar mixture of trimethylol propane triacrylate and trimethylol propane were mixed with 20.0 grams of Desmodur N degassed, put into a mold of the kind described and reacted at 40° C. for 16 hours. Curing was carried out at 70° C. for an additional 16 hours. 0.08 gram of diisopropylpercarbonate was used to catalyze the reaction. This amounted to 0.5% based on the weight of the transesterification product. The isocyanate to hydroxyl ratio of the reaction system was 1. A hard, clear, colorless casting resulted.

The polymer systems prepared above were tested for Haze Gain and Impact Strength. The results of such testing are listed below in Table I.

TABLE I

| Sample of Example No.— | Haze gain, percent | Impact strength (in.-lbs.) | Other characteristics |
| --- | --- | --- | --- |
| 1 | 16 | 1.5 | Tough-hard casting of water-white color. |
| 2 | 9 | 3.5 | Fairly rigid, excellent clarity. |
| 3 | 4 | | Comparable to Example 2. |
| 4 | 12 | | Hard and stiff, excellent clarity. |
| 5 | 4 | 3 | Do. |
| 6 | 4 | 4 | Stiff but tough excellent clarity. |
| 7 | 4 | 11 | Do. |
| 8 | 12 | | Rigid, excellent clarity. |
| Polymethyl methacrylate control. | 18 | 2 | |
| Allyl diglycol carbonate (Cr-39) control. | 8 | 6 | |

The mechanical properties of the resins described in all the preceding examples are substantially improved when the monomers (especially the hydroxyl containing monomers) are prepurified. The removal of water, for example, reduces the amount of urea-type link formation and increases the amount of desirable urethane link formation.

In those cases where good impact strength is achieved, the present invention combines the advantages normally attributed to each polymer system separately, i.e., the castings of the present invention have the clarity and excellent optical properties characteristic of acrylics, and the toughness and good mechanical properties characteristic of urethanes. Example 10 illustrates this:

EXAMPLE 10

The procedure of Example 5 was repeated except that the hydroxyethylacrylate was dried and purified before mixing with the other reactants by passing it slowly through a column of dry silica gel and alumina. The resultant castings had the same abrasion characteristics as the castings of Example 5, but their mechanical properties were remarkably improved. The castings made from purified hydroxyethylacrylate were more difficult to snap by hand flexing than the castings made from unpurified hydroxyethylacrylate (Example 5) or castings of CR-39. In addition, the falling dart impact strength of the castings made from purified hydroxyethylacrylate varied between 13 and 50 in.-lbs., values much higher than those obtained with unpurified HEA based castings or CR-39.

What is claimed is:

1. Transparent articles consisting essentially of the thermoset polymer produced by the process of reacting (A) at least one organic polyisocyanate with (B) a monomer selected from the group consisting of hydroxy alkylacrylate and hydroxy alkylmethacrylate in the presence of a promoter for chain-growth polymerization of ethylenic groups, said chain-growth polymerization proceeding concurrently and simultaneously with the step-growth reaction of NCO and OH groups.

2. Articles as defined in claim 1 having haze gains of less than 10% and impact strength of at least about 3 in.-lbs.

3. The process of reacting (A) at least one organic polyisocyanate with (B) a monomer selected from the group consisting of hydroxy alkyl-acrylate and hydroxy alkylmethacrylate in the presence of a promoter for chain-growth polmerization of ethylenic groups, said chain-growth polymerization proceeding concurrently and simultaneously with the step-growth reaction of NCO and OH groups.

4. A process as defined in claim 3 wherein said hydroxyacrylate compound is a hydroxyalkylacrylate.

5. A process as defined in claim 3 wherein said polyisocyanate is selected from the group consisting of di-, tri-, and tetraisocyanates represented by the formula, $$(OCN)_n-R_1-A-R_2-(NCO)_n$$

wherein A represents an aryl radical, $R_1$ and $R_2$ divalent aliphatic radicals, and $n$ an integer from 1 to 2.

6. A process as defined in claim 3 comprising the additional step of thoroughly drying said hydroxyacrylate compound before the polymerization steps.

7. The process defined in claim 3 wherein said polymerization of ethylenic groups is promoted by a free radical catalyst.

8. The process defined in claim 7 wherein said catalyst is diisopropylpercarbonate.

References Cited

UNITED STATES PATENTS 3,297,745   1/1967   Fekete et al. _____ 260—471

DONALD E. CZAJA, Primary Examiner

H. S. COCKERAM, Assistant Examiner

U.S.Cl. X.R.

260—859